(12) United States Patent
Platt

(10) Patent No.: US 9,185,470 B2
(45) Date of Patent: Nov. 10, 2015

(54) REMOTE PROCESSING OF CONTENT

(75) Inventor: Timothy J. Platt, Andover, MA (US)

(73) Assignee: Nuance Communications, Inc., Burlington, MA (US)

( * ) Notice: Subject to any disclaimer, the term of this patent is extended or adjusted under 35 U.S.C. 154(b) by 378 days.

(21) Appl. No.: 13/463,309

(22) Filed: May 3, 2012

(65) Prior Publication Data

US 2013/0297724 A1 Nov. 7, 2013

(51) Int. Cl.
*H04N 21/8549* (2011.01)
*H04N 21/266* (2011.01)
*H04N 21/2743* (2011.01)
*H04N 21/278* (2011.01)
*H04N 21/414* (2011.01)
*H04N 21/4223* (2011.01)
*H04N 21/4402* (2011.01)
*H04N 21/472* (2011.01)
*H04N 21/61* (2011.01)
*G06F 15/16* (2006.01)
*H04N 7/14* (2006.01)
*H04L 29/06* (2006.01)

(52) U.S. Cl.
CPC ...... *H04N 21/8549* (2013.01); *H04N 21/26603* (2013.01); *H04N 21/278* (2013.01); *H04N 21/2743* (2013.01); *H04N 21/41407* (2013.01); *H04N 21/4223* (2013.01); *H04N 21/4402* (2013.01); *H04N 21/472* (2013.01); *H04N 21/6131* (2013.01); *H04N 21/6181* (2013.01); *G06F 15/16* (2013.01); *H04L 65/604* (2013.01); *H04N 7/14* (2013.01)

(58) Field of Classification Search
CPC .............. G06F 15/16; G06F 17/30799; G06K 9/00711; G06K 9/00718
USPC ........................................... 709/217, 203, 236
See application file for complete search history.

(56) References Cited

U.S. PATENT DOCUMENTS

| | | | | |
|---|---|---|---|---|
| 6,166,735 A * | 12/2000 | Dom et al. | ..................... | 715/749 |
| 6,173,287 B1 * | 1/2001 | Eberman et al. | ............... | 715/232 |
| 7,131,059 B2 * | 10/2006 | Obrador | ....................... | 715/209 |
| 8,151,259 B2 * | 4/2012 | Fadell | ........................... | 717/173 |
| 8,358,273 B2 * | 1/2013 | Hodge et al. | .................. | 345/169 |
| 8,379,154 B2 * | 2/2013 | Zhang | .......................... | 348/701 |
| 2004/0239681 A1 * | 12/2004 | Robotham et al. | ............ | 345/581 |

(Continued)

OTHER PUBLICATIONS

"JBIG2.com:: An Introduction to JBIG2," retrieved from http://jbig2.com/ on Apr. 26, 2012.

*Primary Examiner* — LaShonda Jacobs
(74) *Attorney, Agent, or Firm* — Hamilton, Brook, Smith & Reynolds, P.C.

(57) ABSTRACT

Features of content may be identified using a server that is coupled with a client unit via a bandwidth-limited communications link. In one embodiment, the client unit forwards a subset of representations of the content, such as a lossy compressed version of an image, to the server. The server analyzes the image and forwards information regarding the features included in the content to the client unit. If the server determines that a sufficient number of representations are not available, the server requests the client unit to forward additional representations. An embodiment of the present invention reduces usage of the bandwidth used by the bandwidth-limited communications link by having the server request subsets of representations of the content rather than transmitting all representations for remote processing in a manner supporting a division of labor by the client unit and the server.

20 Claims, 7 Drawing Sheets

(56) References Cited

U.S. PATENT DOCUMENTS

| | | | |
|---|---|---|---|
| 2005/0262533 A1* | 11/2005 | Hart et al. | 725/40 |
| 2005/0289179 A1* | 12/2005 | Naphade et al. | 707/104.1 |
| 2007/0101387 A1* | 5/2007 | Hua et al. | 725/113 |
| 2007/0162857 A1* | 7/2007 | Weber et al. | 715/731 |
| 2008/0027894 A1* | 1/2008 | Molaro et al. | 707/1 |
| 2010/0118035 A1* | 5/2010 | Yamakami | 345/473 |
| 2010/0194753 A1* | 8/2010 | Robotham et al. | 345/428 |
| 2010/0260468 A1* | 10/2010 | Khatib et al. | 386/52 |
| 2012/0042050 A1* | 2/2012 | Chen et al. | 709/219 |
| 2012/0042090 A1* | 2/2012 | Chen et al. | 709/231 |
| 2012/0245720 A1* | 9/2012 | Story et al. | 700/94 |
| 2013/0094756 A1* | 4/2013 | Li et al. | 382/155 |
| 2013/0159546 A1* | 6/2013 | Thang et al. | 709/231 |
| 2014/0089452 A1* | 3/2014 | Beck et al. | 709/213 |

* cited by examiner

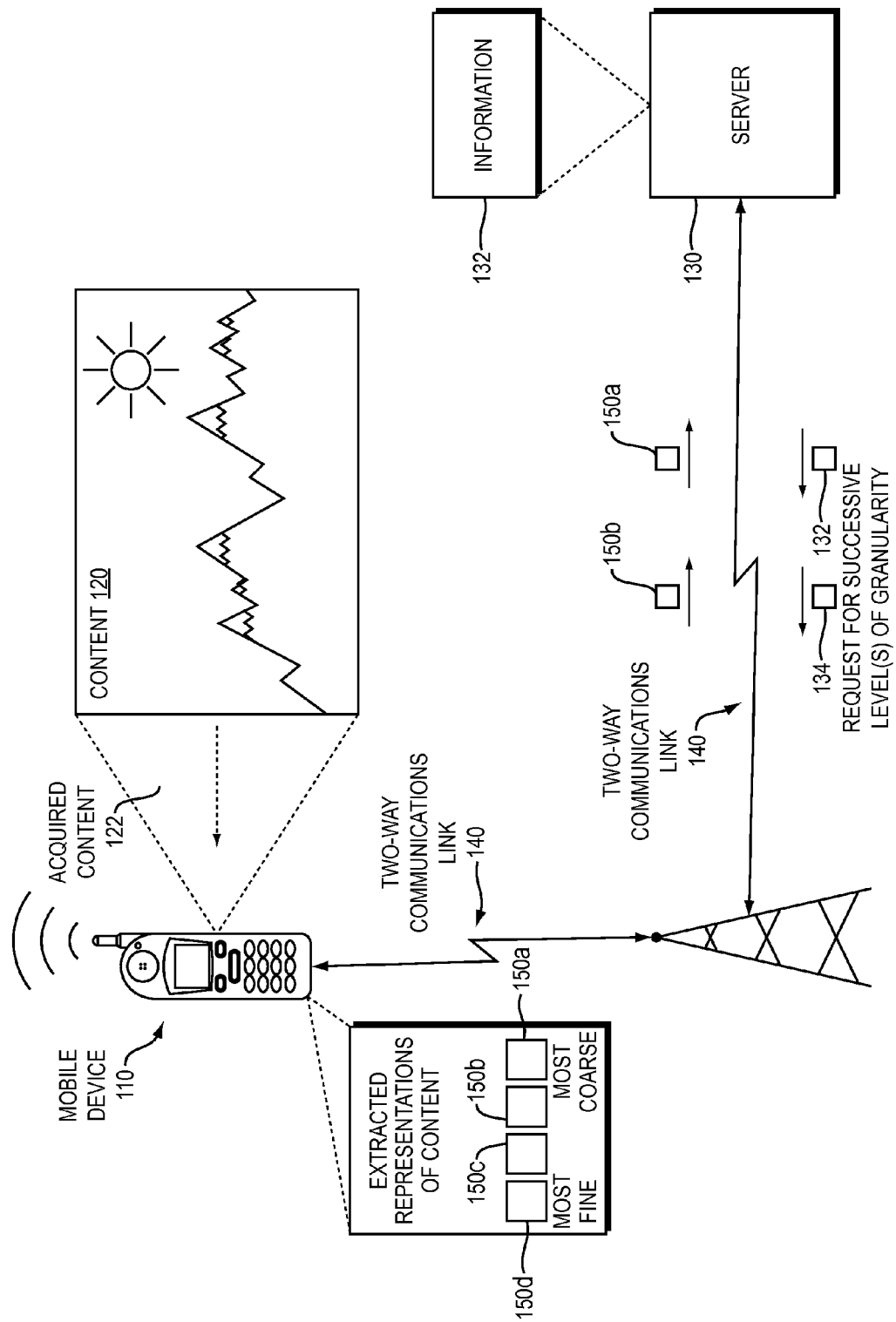

REMOTE PROCESSING OF CONTENT

BACKGROUND

Remote processing typically refers to the use of a remote processing center (e.g., located across a wide area network or in "the cloud") relative to a client device and configured to execute a task or subroutine for the client device. A remote processing center can employ one or many processors operative to process representation(s) of content in the form of an image file or audio file, for example, on behalf of a client device and return requested data.

SUMMARY

An example embodiment of the present invention relates to a system for jointly determining information about content by a client unit and a server. In one embodiment, the client unit is configured to acquire and extract representations of features of the content at selectable levels of granularity. The client unit sends a request to the server to determine information about the content. In doing so, the client unit sends the representations at an initial level of granularity. The client unit, in response to a request from the server for representations at a successive level of granularity, sends representations at the successive level of granularity. Following processing by the server, the client unit receives the information about the content, or representation of the content itself (e.g., editable text or other format beyond pixels composing an image) from the server. It should be understood that a successive level of granularity need not be an incrementally next level, but instead may skip levels of granularity.

In one embodiment, the server is configured to receive a representation of features of the content at an initial level of granularity from the client device. The server determines information about the content using the representation at the initial level of granularity. In an event the information about the content cannot be determined, the server requests representations at a successive level of granularity from the client device. The server then forwards the information about the content to the client unit.

In some embodiments, the client unit may be arranged to compress the features of the content to produce the representations at the initial and successive level(s) of granularity. The client unit may be arranged to employ a lossy compression engine to compress the features of the content. The client unit and the server may be in operative communication via a bandwidth-limited link.

The information about the content may include information about an image (e.g., graphics or photograph), text, audio, or video found in the content, where any such terms are interchangeable as used herein unless otherwise specified.

Certain embodiments of the present invention relate to a method and corresponding apparatus for obtaining information relating to features of content. The embodiments forward a plurality of representations that are extracted by a client unit and may be a subset of available representations of the content from the client unit to a server. The client unit further forwards at least one additional representation, extracted from the content by the client unit, to the server responsive to a request by the server and obtains information relating to the features of content from the server.

In some embodiments, the client unit may compress the features of the content to produce the plurality of representations. Compressing of the features of content may include compressing the features of the content using a lossy compression engine. In some embodiments, compressing the features of content using a lossy compression engine may include running the lossy compression engine at a predetermined compression rate. Alternatively, the predetermined compression rate may be user-determined or determined based on a negotiation between the client unit and the server.

In certain embodiments, the client unit may forward the plurality of representations and the at least one additional representation via a bandwidth-limited link to the server.

In some embodiments, the client unit may extract the plurality of representations from at least one of an image, text, video stream, or audio stream. The client unit, in certain embodiments, may classify the content into one or more groups of representations and extract at least one representative representation describing each group of representations.

In some embodiments, the information obtained from the server may be reported from the client unit to a module that makes use of the information.

In certain embodiments, the client unit may forward the at least one additional representation by forwarding refinement information for the server to use in obtaining information relating to the features of content. The refinement information may represent a difference or subset of differences between the plurality of representations previously sent from the client unit to the server and the available representations of the content available to or previously calculated by the client unit.

In some embodiments, the information relating to the features of content may include an estimated representation of the content by the client unit from the server.

A further embodiment of the present invention relates to a method and corresponding apparatus for providing information relating to features of content. The embodiment obtains, by a server, a plurality of representations, extracted by a client unit of the content. The representations may be a subset of available representations of the content. The embodiment uses the server to determine information relating to the features of the content, and, in an event a sufficient number of representations describing the features of content is not available, obtains, by the server from the client unit, at least one additional representation extracted from the content by the client unit. The server thereafter reports information relating to the features of the content to the client unit.

In some embodiments, the plurality of representations obtained from the client unit by the server may include representations of at least one of an image, text, video stream, or audio stream. The server may obtain the plurality of representations and the at least one additional representation via a bandwidth-limited link from the client unit. The client unit may be a wireless device, such as handheld wireless device, or a computer coupled to a network via a wire or fiber optic link.

In some embodiments, the server may obtain at least one representative representation describing a group of representations. The group of representations may be a subset of one or more groups of representations obtained using the client unit by classifying the representations of the content. In certain embodiments, the plurality of representations may include compressed representations of the features of content. The compressed representations may include compressed representations obtained by compressing the features of content using a lossy compression engine. In some embodiments, the compressed representations may be obtained using the lossy compression engine at a predetermined compression rate. Alternatively, the compression rate may be user-determined or determined based on negotiations between the client unit and server.

In some embodiments, the server determines the information relating to the features of content by determining an estimated representation of the content. In order to determine the information relating to the features of content, the server may access a database of features and identify a database member that provides a fit to the representations extracted by the client unit. In certain embodiments, the server may determine the information relating to the features of content by performing optical character recognition on the representations extracted by the client unit at the initial level of granularity and, if so requested and received, successive level(s) of granularity.

In some embodiments, the server may determine whether a sufficient number of representations describing the features of content is available using feedback from a user of the client unit.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a high-level diagram of an example embodiment of the present invention.

DETAILED DESCRIPTION

Figure 2A:
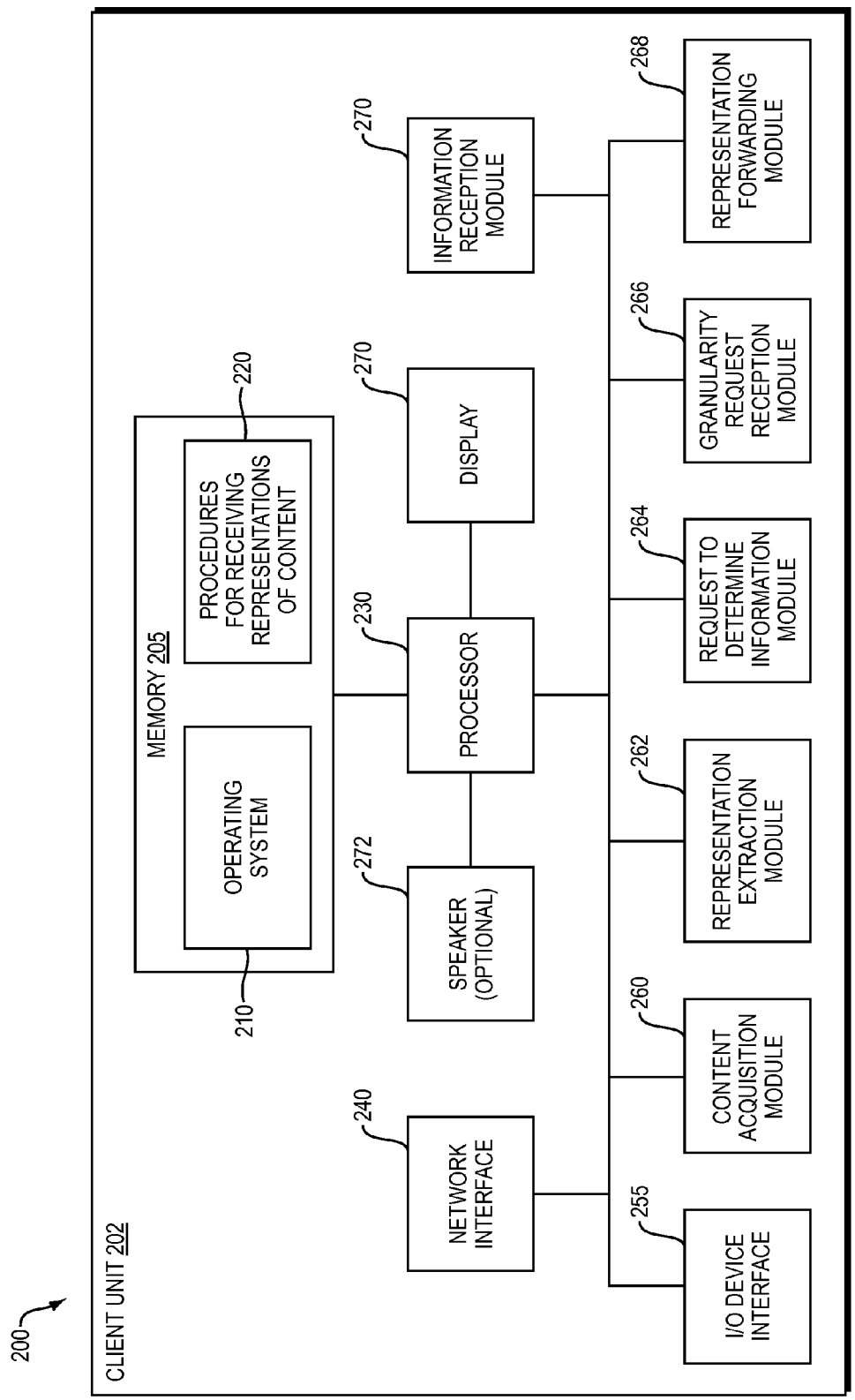
FIG. 2A is a block diagram of a client unit that may be used with the techniques described herein.

A description of example embodiments of the invention follows.

FIG. 1 is a high-level diagram of an example embodiment of the present invention. As shown in FIG. 1, a mobile device 110 takes a photograph or otherwise obtains an image or representational indication of content 120. Examples of content 120, as used herein, include text, graphic (e.g., barcode), audio, and/or video.

The mobile device 110A extracts representations of the content 120. Each of the extracted representations of content 150 has a different level of granularity, with the finest level of granularity optionally being a digitized, uncompressed representation of the content 120 itself. An example of a technique used to create the representations of an image can be found in font compression technology or other compression technology as known in the art.

In the example environment and embodiment of FIG. 1, the mobile device 110 transmits a subset of the extracted representations of content 150a-d, such as one at an initial granularity 150a, to a server 130 via a two-way communications link 140. The two-way communications link 140 may be any wired or wireless band-limited link known in the art. The server 130 analyzes received extracted representations of content 150 and attempts to determine information 132 regarding features included in the content 120. If the server 130 can determine the information 132, the server 130 forwards the information 132 determined to the mobile device 110. If the server 130 cannot determine the information 132, the server sends a request 134 for an extracted representation of content at a successive level of granularity, such as extracted representations of content 150b, 150c, or 150d. It should be understood that each successive level in this example embodiment includes additional amounts of data to represent the content and, therefore, uses more network bandwidth. Therefore, in certain embodiments, a sequential sending of extracted representations of content from most coarse to most fine granularities, 150a, 150b, 150c, 150d, in that order in this example, occurs, with the goal of having the server 130 determine the information 132 using the most coarse granularity of representations as possible so as to use the least network bandwidth as possible during the process.

The mobile device 110 may be any device capable of communicating with the server 130. For example, the mobile device 110 may be a wireless phone or a tablet computer.

In some embodiments, the extracted representations of content 150a-d may be encoded such that the server 130 begins processing them as soon as it receives a first representation of the extracted representations of content 150a. Further to the description above, the extracted representations of content 150a-d may include representations with coarse granularity 150a that require less bandwidth to transmit and, therefore, can be transmitted quickly. For example, in certain embodiments, the processing of the extracted representations of content 150a-d may start after the beginning of transmission of the most coarse granularity representation 150a of the extracted representations of content 150a from the mobile device 110 to the server 130. Specifically, the server 130 may begin processing the extracted representations of content 150a-d upon receiving a predetermined subset of the extracted representations of content 150a. The server 130 does not have to wait to receive all available representations from the mobile device 110 to begin processing. In one example embodiment, the mobile device 110 initially transmits a predetermined subset of the available extracted representations of content 150a to the server 130 for processing. Following receipt of the predetermined subset of the extracted representations of content 150a, the server 130 initiates processing of the representations. The server 130 may thereafter send a request 134 to the mobile device for additional extracted representations of content 150b, if the server 130 determines the initially (or previously) received representations of content, for example, are insufficient. In this embodiment, the server 130 begins processing representations of the content 120 earlier than if the server 130 had waited to receive the entire set of representations 150a-d of content 120 because the predetermined subset may be smaller, and therefore faster, to transmit from the mobile device 110 to the server 130.

In certain embodiments, the mobile device 110 performs initial processing of a representative indication (i.e., acquired content 122) of the content 120 to create the extracted representations of content 150a-d. For example, for cases in which the extracted representations of content 150a-d relate to an image, such as text or graphic, the mobile device 110 may initially process indications of the image using a symbol-based compression to reduce the size of the extracted representations of content 150a-d. In some embodiments, the mobile device 110 initially transfers a symbol dictionary block (e.g., library) (not shown) to the server 130 to interpret later received extracted representations of content 150a-d. The server 130 may recognize the symbols using the symbol dictionary block in a separate thread in processing the representations 150a-d of the content 120.

In some embodiments, if appropriate, the mobile device 110 may forward a position block (not shown) of the content 120 to the server 130. After receiving the position block, the server 130 may identify all or at least a part of preliminary identities of characters from the symbol dictionary block. The server 130 may use the symbol dictionary block to segment the content 120 into classes, such as columns, paragraphs, lines, or words, so the server 130 can apply language specific knowledge, including dictionary lists, diagrams, trigrams, and natural language rules to resolve ambiguities in the recognition results obtained from processing the symbol dictionaries.

In some embodiments, the system (i.e., mobile device 110 and server 130) may employ a lossy symbol-based compression. In such embodiments, a compressed stream data stream flowing upstream via the two-way communications link 140) may include a correction portion (not shown) of the stream representing a difference between the extracted representations of content 150a-d (obtained from performing lossy decompression based on at least one of the symbol dictionary block and the position block) and the original content 120. The mobile device 110 may, in some embodiments, transmit the correction portion to the server 130 after sending an initial subset of the extracted representations of content 150a. The server 130 uses the correction portion to refine representations of portions of the content 120 for cases in which recognition results are ambiguous.

The mobile device can be any device capable of receiving information, such as a client unit. Examples of client units include cellular phones, mobile media players, tablet computers, e-Readers, personal computers, laptop computers, digital cameras, video recorders and audio recorders.

FIG. 2A is a block diagram 200 of a client unit 202 110 that may be used with the techniques described herein.

The client unit 202, such as the mobile device 110 of FIG. 1, may include a memory unit 205 operatively coupled to a processor 230. The processor 230 may be connected to various interfaces via an input/output (I/O) device interface 235. The memory unit 205 may be a computer-readable memory or a non-transitory computer readable medium and include combinations of non-volatile memory devices. The memory unit 205 is configured to hold various computer-executable instructions and data structures including computer-executable instructions and data structures that implement aspects of the techniques described herein.

Figure 4:
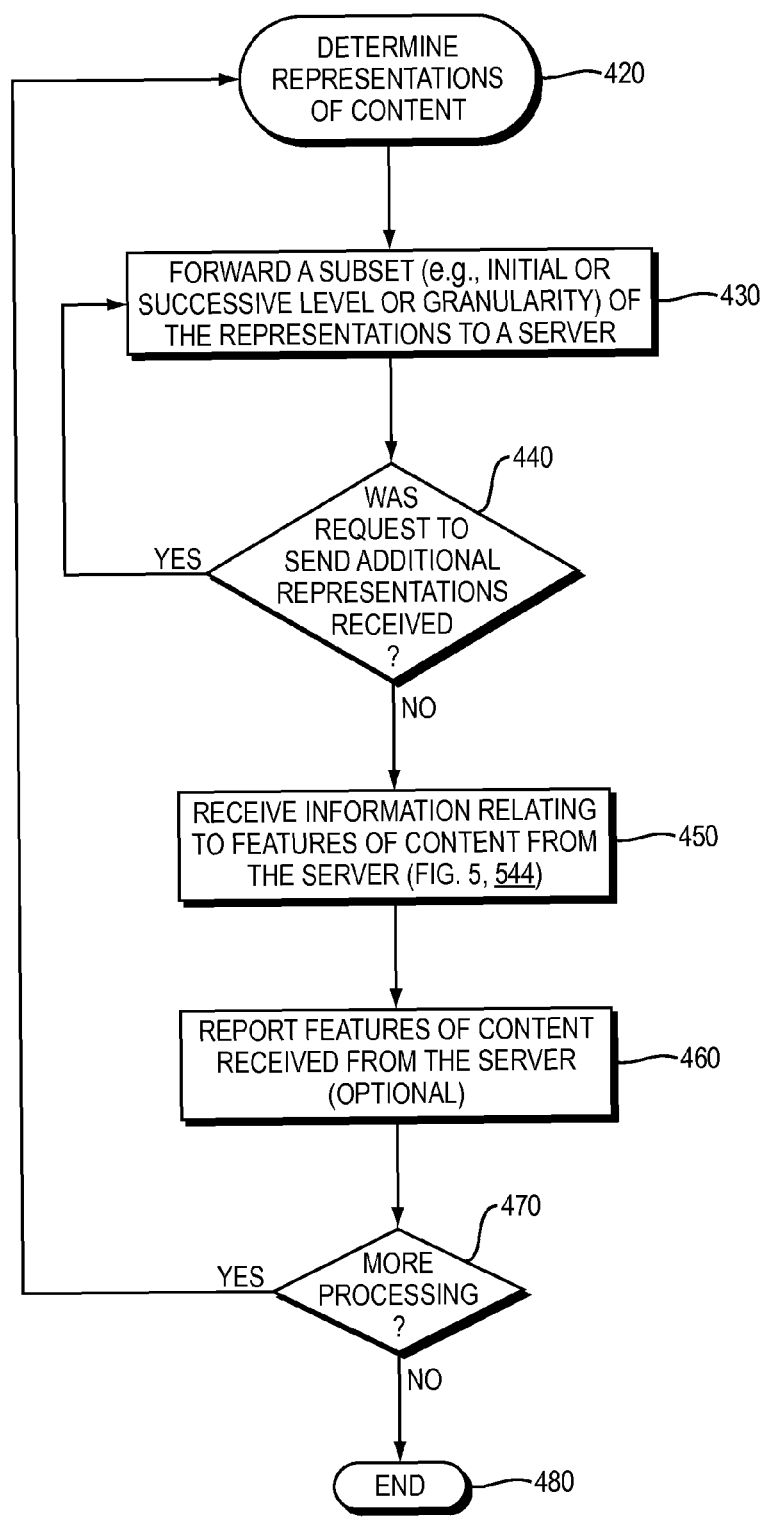
FIG. 4 is a flow diagram illustrating procedures for obtaining information relating to features of content according to an example embodiment.

The memory unit 205 may include a unit for storing procedures to obtain extracted representations of content, according to an example embodiment of the present invention (illustrated in detail in FIG. 4). The memory unit 205 may also store an operating system 210 to implement various conventional operating system functions, including task and process scheduling, memory management, and controlled access to various devices, such as a content acquisition module 260 (e.g., camera or voice recorder) coupled to the processor 230. The processes may include computer-executable instructions and data that are configured to implement various aspects of the techniques described herein.

The content acquisition module 260 is configured to acquire content. A representation extraction module 262, coupled with the processor 230, is configured to extract representations of features of the content at selectable levels of granularity. A request to determine information module 264 is configured to forward a request to determine the information of the acquired content to a server, e.g. over the network interface 240. Upon forwarding a request to determine information of the content, the request to determine information module 264 activates a representation forwarding module 268, which forwards an representations of the content at an initial level of granularity. The granularity request reception module 266 is configured to receive requests for successive level of granularity. Upon receiving a request, the granularity request reception module 266 is configured to activate the representation forwarding module 268. The representation forwarding module 268 forwards a representation of the content at a successive level of granularity, should any such representation exist. Thereafter, a information reception module 270 receives information from the server.

The client unit 202 may also include a network interface 240 coupled to the processor 230 to connect the client unit 202 to a network. The client unit 202 may be connected to the network through a band-limited wired or wireless connection. The processor 205 may include a conventional central processing unit (CPU) comprising processing circuitry that is configured to execute various instructions and manipulate data structures from the memory unit 205.

The I/O device interfaces 235 may include logic (not shown) to interface with various input and/or output devices (not shown), such as a keypad or mouse, and with the processor 230. The I/O device interfaces 235 may be configured to allow signals (not shown) to be transferred between the client unit 202 and server (not shown). The client unit 202 may further include an optional display unit 270 and/or an optional speaker unit 272. The optional display unit 270 and optional speaker unit 272 may be employed in embodiments in which the features of content (not shown) may be reported to a user of the client unit 202 through audio or image/video formats.

It should be understood that the server, such as the server 130 of FIG. 1, may have a similar internal configuration as the client unit 202 or may have other internal configurations, such as distributed or parallel processors and associated memory, I/O, and other configurations, as known in the art.

Figure 2B:
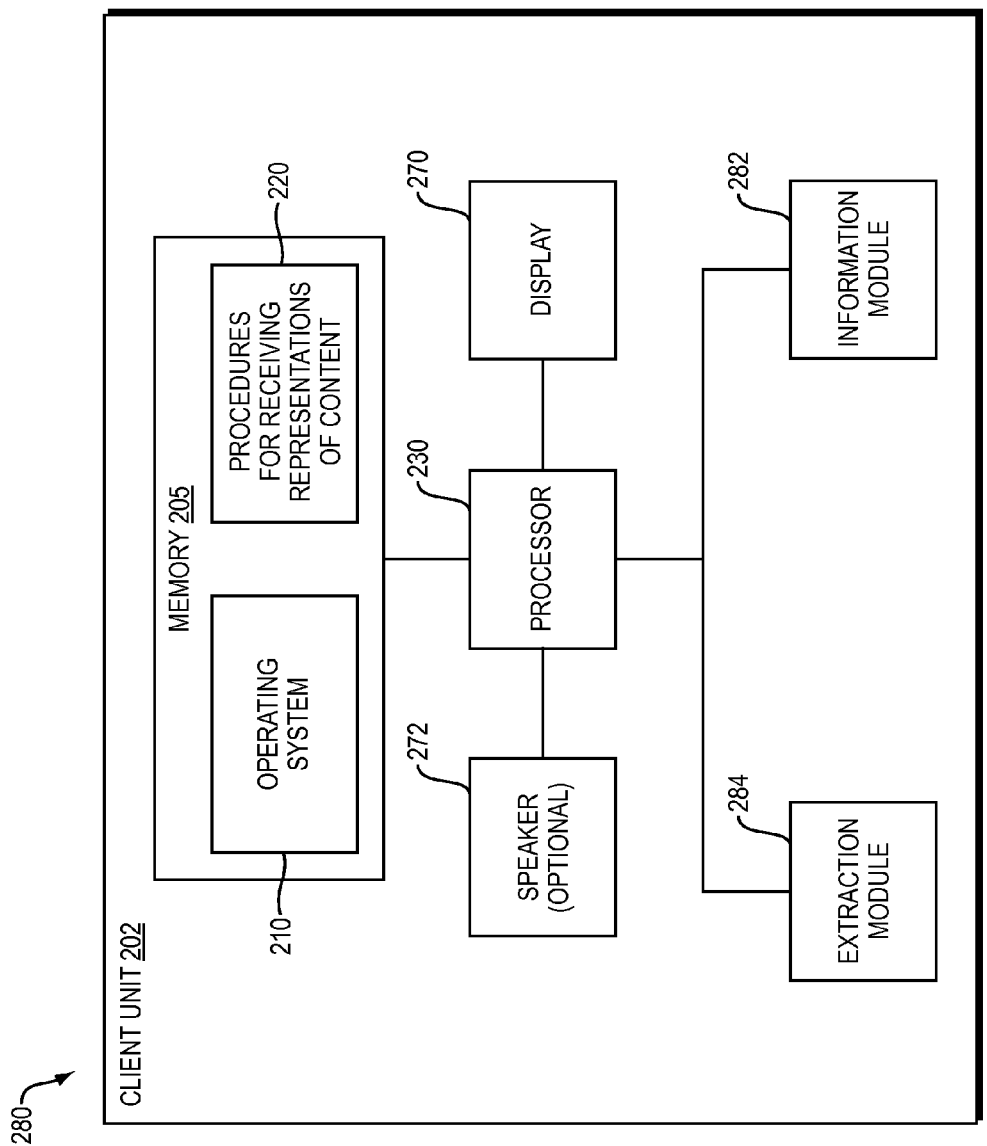
FIG. 2B is a block diagram of the client unit that may be used with the techniques described herein.

FIG. 2B is a block diagram 280 of the client unit 202. Elements of the client unit 202 illustrated in FIG. 2B are operatively similar to the foregoing elements described in reference to FIG. 2A. In one embodiment, however, the client unit 202 includes an extraction module 284 and an information module 282. The extraction module 284 is configured to extract representations from the content, such as through a lossy compression procedure. The lossy compression procedure can compress the data at a predetermined rate, where the predetermined rate is determined by at least one of a user determination, negotiation between the client unit 202 and the server, a configuration setting, a reading of memory available, or the bandwidth of the link between the client unit 202 and the server. The extraction module 284 is further configured to forward the extracted representations to a server (not shown) (e.g., for analysis). The extraction module 284 is also configured to forward subsets of the extracted representations to the server. In one embodiment, the extraction module 284 is configured to extract an additional representation or representations of the content in response to a request from the server, and forward the additional representation(s) to the server. The additional representation(s) can be forwarded to the server as refinement information, where the refinement information transfers the difference between the previously sent representation(s) and the additional representation(s) being transferred.

The extraction module 284 may be configured to classify the content into one or more groups of representations and extract from the group(s) at least one representative representation describing each group of representations. It should be understood that the server, to use such an embodiment, performs procedures that can determine information about the content based on such representative representations.

In one embodiment, the client unit 202 includes an information module 282. The information module 282 is configured to receive (or obtain) information that relates to the features of the content. The information is determined by the server from the forwarded plurality of representations.

Figure 3A:
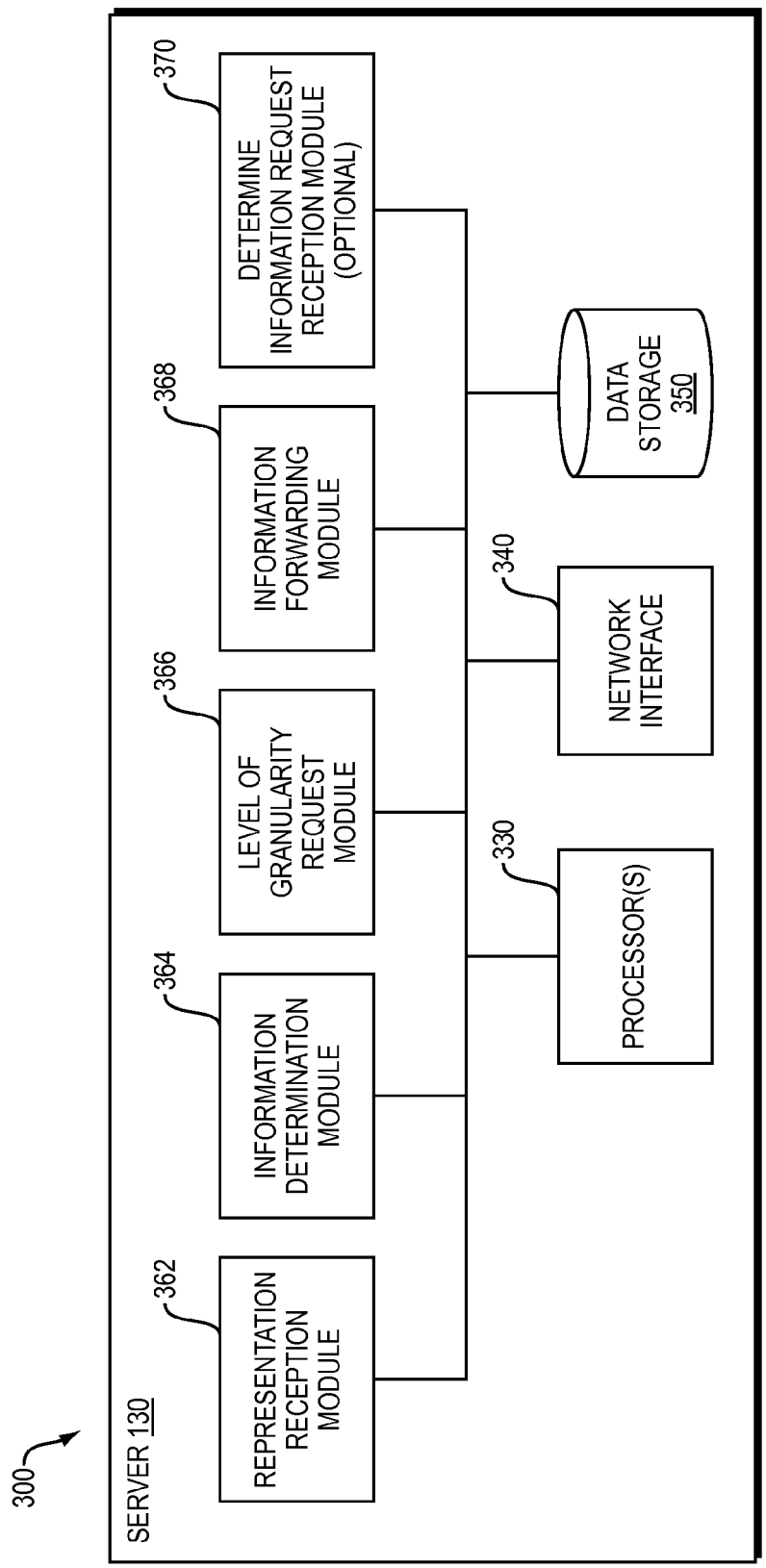
FIG. 3A is a block diagram of a server that may be used with the techniques described herein.

FIG. 3A is a block diagram 300 of a server 130 that may be used with the techniques described herein. As shown, the server 130 may include one or more processors 330. The processor 330 may include a conventional central processing unit (CPU) comprising processing circuitry that is configured to execute various instructions and manipulate data structures required for performing procedures associated with the embodiments described herein. Each processor is coupled with a memory unit (not shown). The memory unit (not shown) may include an operating system configured to implement various operating system functions including scheduling tasks and processes, managing memory, and controlling access to various devices, such as a data storage unit 350. The data storage unit 350 may store data needed for determining information regarding features of content (not shown). For example, in some embodiments, the data storage unit 350 may include a database (not shown) of features (not shown) that may be used to identify the representations of content (not shown) obtained by the server 130.

In one embodiment, the server 130 optionally includes a determine information request module 370 configured to receive requests to determine information of a content. Upon receipt of such a request, a representation reception module 362 receives an initial representation of content. Alternatively, the representation reception module 362 can receive the initial representation of content without the server 130 receiving any prior request. Regardless, an information determination module 364 determines information based on the initial representation of content. If the information determination module 364 requires more information, it activates the level of granularity request module 366, which forwards a request for representations of the content at successive levels of granularity, for example over network interface 340. Upon receiving an adequate level of granularity or determining no higher level of granularity is available, the information determination module 364 activates the information forwarding module 368 to forward its results, for example over network interface 340.

Figure 3B:
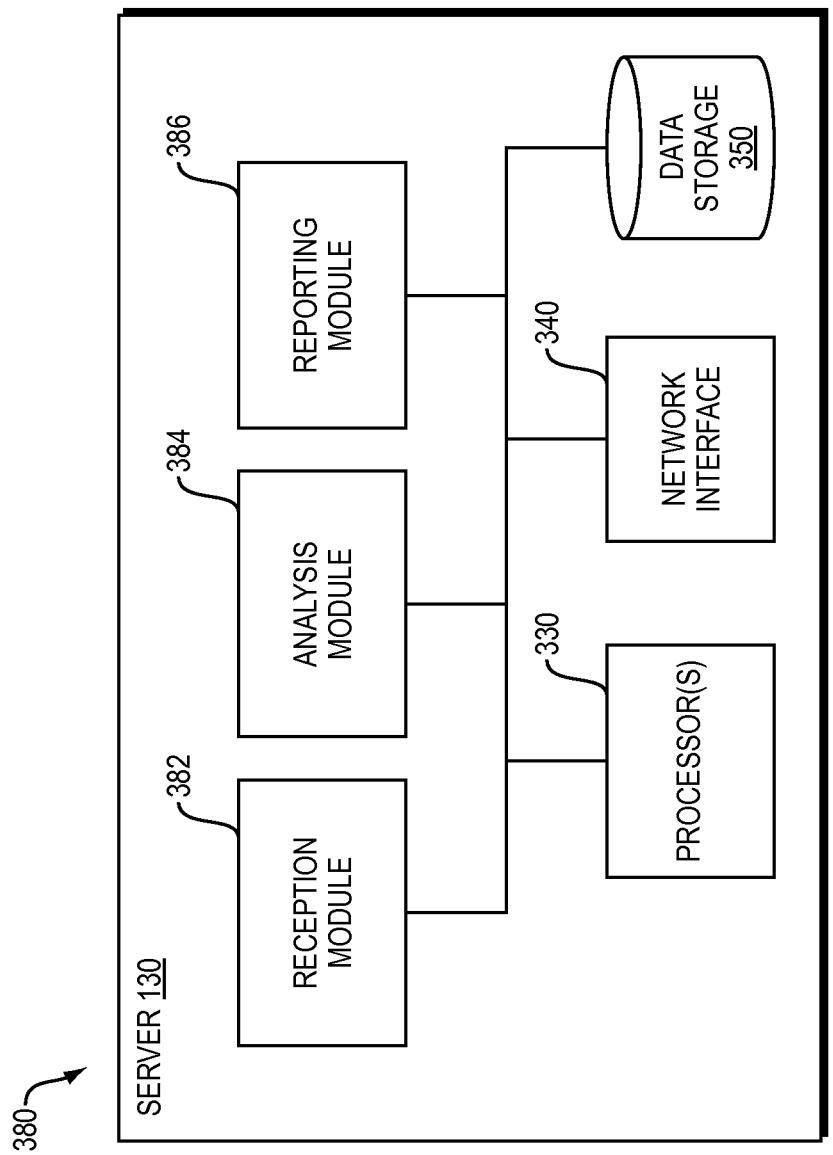
FIG. 3B is a block diagram of a server that may be used with the techniques described herein.

FIG. 3B is a block diagram 380 of a server 130 that may be used with the techniques described herein. Elements of the server 130 illustrated in FIG. 3B are operatively similar to the foregoing elements described relating to FIG. 3A. In one embodiment, the server 130 includes a reception module 382 configured to receive a plurality of representations of content from a client unit. The plurality of representations can be a subset of available representations of the content. The plurality of representations can be received from the client unit in response to a request, issued by the server to the client unit, to send more representations of content to the server. The reception module 382 is configured to receive refinement information from the client device, where the refinement information includes additional information to create an additional representation of content at a successive level of granularity.

In one embodiment, the server 130 includes an analysis module 384. The analysis module 384 is configured to determine information relating to the features of the content. The analysis module 384 is further configured to, in an event that a sufficient number of representations describing the features of content is not available, request (and/or obtain) additional representations from the client device. The analysis module 384 is further configured to, in an event that a sufficient number of representations describing the features of content is available, determine the information relating to the features of the content. In one embodiment, the analysis module 384 is configured to perform optical character recognition on the representations of content to determine textual information relating to the content (e.g., the content being an image including text). The analysis module 384 can also either decompress compressed representations of the features of content before performing analysis, or perform analysis directly on the compressed representations.

The analysis module 384, in analyzing the representations of content, can access a database of features, where the features correspond to information or fragments of information. The analysis module 384 can identify a database member (e.g., a feature stored in the database) that provides a fit to the representation extracted by the client unit. In this manner, the analysis module 384 can incrementally determine the information of the content by identifying features stored in the database of features.

In one embodiment, the server 130 includes a reporting module 386. The reporting module 386 is configured to report information relating to the features of the client to the client unit. The reporting module 386 reports the information determined by the analysis module 384.

FIG. 4 is a flow diagram illustrating procedures for obtaining information relating to features of content according to an example embodiment. First, a client unit determines a plurality of representations from the content (420). The content may include an image, audio, or video of a target. In certain embodiments, the target may include text. The client unit may include handheld devices such as a wireless or mobile phones. In certain embodiments, the client unit may include digital cameras (not shown), a video cameras (not shown), or an audio recorders (not shown). The client unit may communicate with a remote server via a wired or wireless band-limited link.

The client unit then forwards a subset of the plurality of representations of the content to a server (430). The subset of the plurality of representations may be a subset of available representations of the content. The subset of the plurality of representations, for example, can be an initial level of granularity or a successive level of granularity. For example, the client unit may compress the content to multiple levels of granularity to produce the plurality of representations of the content. In certain embodiments, the client unit may compress an image or video file using image compression or video compression standards known in the art. In some embodiments, the features of the content may be compressed using a lossy compression engine at a predetermined compression rate.

The client unit then determines whether it has received a request from the server for additional representations of the content (440). If the client unit has received the request, it forwards another subset of representations of the content to the server, if the subset is available at the client unit (430). The at least one additional representation may include refinement information for the server to use in obtaining information relating to the features of content. The refinement information may represent a difference between one of the plurality of representations extracted from the content and the representations of the content received by the server.

If the client unit has not received a request to transmit additional elements, it receives information relating to the features of the content from the server (450). The information relating to the features of the content may include an estimated representation of the content by the client unit from the server. In some embodiments, the client unit may report the information obtained from the server to a module that makes use of the reported information (460).

Then, the client unit determines whether more processing is required. (470). If more processing is required, the client unit determines representations of content (420). If no more processing is required, the client unit ends the process (480).

Figure 5:
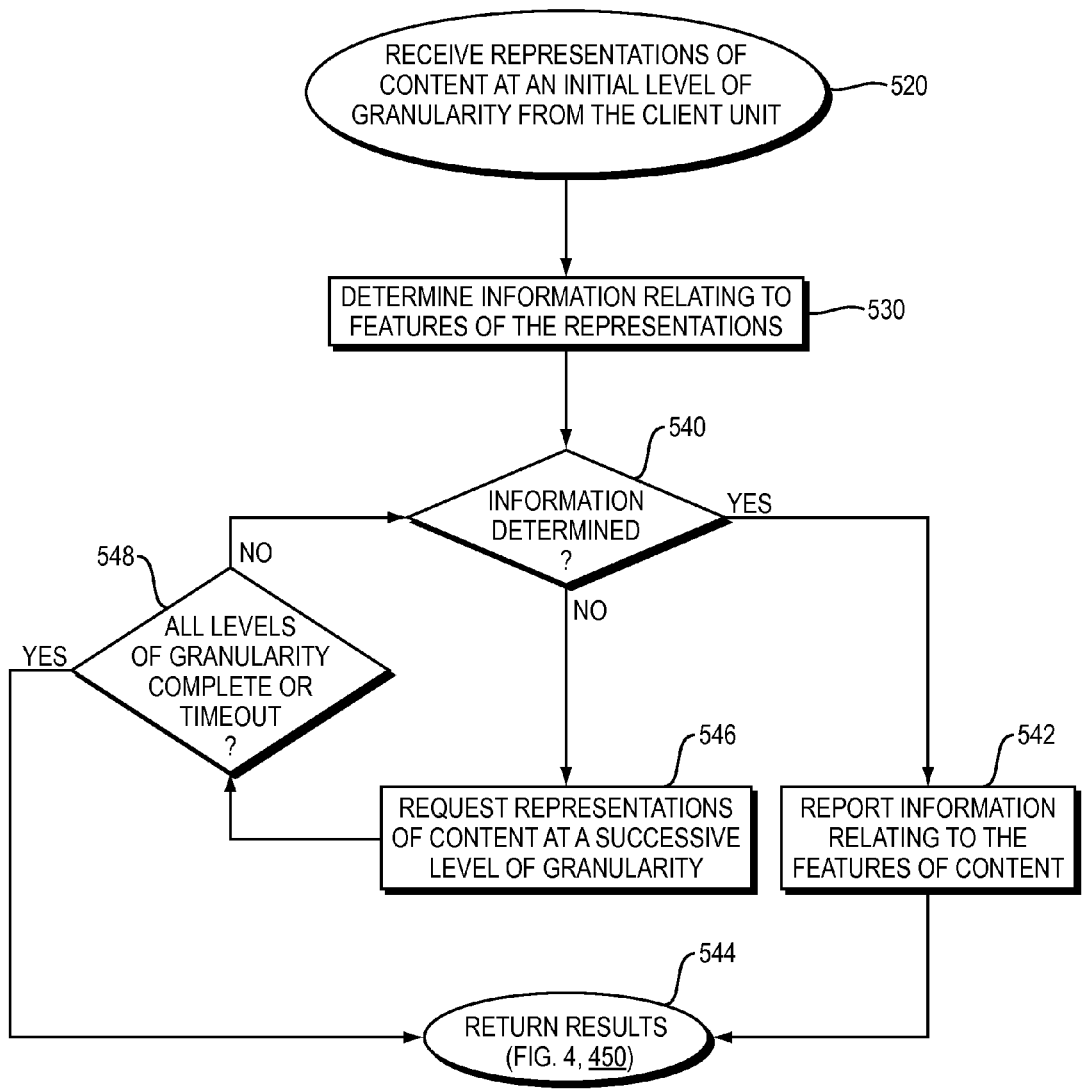
FIG. 5 is a flow diagram illustrating procedures for providing information relating to features of content according to an example embodiment.

FIG. 5 is a flow diagram illustrating procedures for providing information relating to features of a content according to an example embodiment. In this example embodiment, a server receives representations of the content at an initial level of granularity extracted by a client unit (520). The plurality of representations of the content may be a subset of available representations of the content. For example, the server may receive representations of an image, audio, or video of a target. In certain embodiments, the target may include text. The server may be any processing system known in the art. The server may communicate remotely with the client unit via a wired or wireless band-limited link.

For example, the client unit may produce the plurality of representations by compressing the features of the content. In certain embodiments, the client unit may compress an image or video file using image compression or video compression standards known in the art. In some embodiments, the features of the content may be compressed using a lossy compression engine at a predetermined compression rate.

The server determines information relating to the features of the content by analyzing the received representations of the content (530). Then the server determines whether it has determined the information from the received representations of content. (540). If not, the server requests the client unit transmit at least one additional representation extracted from the content (546). The at least one additional representation may include refinement information for the server to use in obtaining information relating to the features of the content. The refinement information may represent a difference between the plurality of representations extracted from the content and the received representations of the content. Then, the server determines whether all levels of all levels of granularity have been received, or whether the client unit has timed out (548). If either all levels of granularity have been received, or the client unit has timed out, the server returns the results to the client device, as further described in FIG. 4 (544).

If the server has received a sufficient number of representations describing the features of content, it reports the information relating to the features of the content to the client unit (542). The information relating to the features of the content may include an estimated representation of the content. Then, the server returns the results to the client unit, as indicated in FIG. 4 (544).

Embodiments or aspects of the present invention may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method for obtaining information relating to features of content, the method comprising:
   forwarding a plurality of representations of the content, extracted from the content by a client unit, to a server, the plurality of representations of the content being a subset of available representations of the content, and each of the plurality of forwarded representations of the content having a different level of granularity;
   forwarding at least one additional representation of the content, extracted from the content by the client unit, to the server in an event of a request by the server; and
   obtaining information relating to the features of content from the server by the client unit.

2. The method of claim 1 further comprising, using the client unit, compressing the features of content to produce the plurality of representations of the content.

3. The method of claim 2 wherein compressing the features of content includes compressing the features of content using a lossy compression engine.

4. The method of claim 3 wherein compressing the features of content using a lossy compression engine includes running the lossy compression engine at a predetermined compression rate.

5. The method of claim 4 wherein the predetermined compression rate is user-determined or determined based on a negotiation between client unit and the server.

6. The method of claim 1 wherein forwarding the plurality of representations of the content and forwarding the at least one additional representation from the client unit utilize a bandwidth-limited link to the server.

7. The method of claim 1 further comprising, using the client unit, extracting the plurality of representations of the content from at least one of an image, text, video stream, or audio stream.

8. The method of claim 1 further comprising, using the client unit:
   classifying the content into one or more groups of representations; and
   extracting at least one representative representation describing each group of representations.

9. The method of claim 1 further comprising reporting the information from the client unit to a module that makes use of the information.

10. The method of claim 1 wherein forwarding the at least one additional representation includes forwarding refinement information for the server to use in obtaining information relating to the features of content.

11. The method of claim 10 wherein the refinement information represents a difference between the plurality of representations of content extracted from the content and the available representations of the content.

12. The method of claim 1 wherein obtaining the information relating to the features of content includes obtaining an estimated representation of the content by the client unit from the server.

13. An apparatus for obtaining information relating to features of content, the apparatus comprising:
   an extraction module configured to extract, in conjunction with a processor, a plurality of content representations from the content, each of the plurality of representations of the content having a different level of granularity, and forward the plurality of content representations to a server, the content representations being a subset of available content representations, extract at least one additional content representation, and forward the at least one additional content representation to the server in an event of a request by the server; and an information module configured to obtain, in conjunction with the processor, information relating to the features of content from the server.

14. The apparatus of claim 13 wherein the information of the content includes information about text found within the content.

15. The apparatus of claim 13 further comprising a compression module configured to compress the features of the image to produce the representations at the initial and successive levels of granularity.

16. The apparatus of claim 13 further comprising a lossy compression engine to compress the features of the image.

17. The apparatus of claim 13 wherein the client unit and the server are in operative communication via a bandwidth-limited link.

18. A method for providing information relating to features of content, the method comprising:

obtaining, by a server, a plurality of content representations, extracted by a client unit of the content, the plurality of content representations being a subset of available content representations, and each of the plurality of obtained content representations having a different level of granularity;

determining information relating to the features of content, using the server, and, in an event a sufficient number of content representations describing the features of content is not available, obtaining, by the server, at least one additional content representation extracted from the content from the client unit; and reporting, by the server, the information relating to the features of content to the client unit.

19. The method of claim 18 wherein the plurality of content representations obtained from the client unit by the server include representations of at least one of an image, text, video stream, an audio stream.

20. The method of claim 18 further including, by the server, obtaining the plurality of content representations and the at least one additional representation via a bandwidth limited link from the client unit.

* * * * *